United States Patent
Glen

(10) Patent No.: US 8,479,253 B2
(45) Date of Patent: Jul. 2, 2013

(54) METHOD, APPARATUS AND MACHINE-READABLE MEDIUM FOR VIDEO PROCESSING CAPABILITY COMMUNICATION BETWEEN A VIDEO SOURCE DEVICE AND A VIDEO SINK DEVICE

(75) Inventor: David I. J. Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 1393 days.

(21) Appl. No.: 11/957,852

(22) Filed: Dec. 17, 2007

(65) Prior Publication Data

US 2009/0153734 A1    Jun. 18, 2009

(51) Int. Cl.
*H04N 7/18* (2006.01)
*H04N 7/16* (2006.01)
*H04N 7/00* (2011.01)
*H04N 5/14* (2006.01)

(52) U.S. Cl.
USPC ............. 725/153; 725/98; 725/133; 725/141; 725/143; 348/552; 348/571

(58) Field of Classification Search
USPC ................... 348/552, 571; 725/98, 114, 133, 725/141, 143, 153
See application file for complete search history.

(56) References Cited

U.S. PATENT DOCUMENTS

| | | |
|---|---|---|
| 6,314,479 B1 | 11/2001 | Frederick et al. |
| 6,484,128 B1 | 11/2002 | Sekiya et al. |
| 7,079,128 B2 | 7/2006 | Kim |
| 7,548,675 B2 * | 6/2009 | Tatum et al. ............. 385/100 |
| 7,954,131 B2 * | 5/2011 | Cholas et al. ............. 725/112 |
| 2001/0019365 A1 | 9/2001 | Kim et al. |
| 2002/0161844 A1 | 10/2002 | Overtoom |
| 2004/0085283 A1 | 5/2004 | Wang |
| 2006/0077778 A1 | 4/2006 | Tatum et al. |
| 2006/0140499 A1 | 6/2006 | Kang et al. |
| 2006/0184992 A1 | 8/2006 | Kortum et al. |
| 2007/0186015 A1 | 8/2007 | Taft et al. |
| 2007/0286246 A1 | 12/2007 | Kobayashi |

(Continued)

FOREIGN PATENT DOCUMENTS

| | | |
|---|---|---|
| CN | 1815606 A | 8/2006 |
| EP | 1677249 A2 | 7/2006 |

(Continued)

OTHER PUBLICATIONS

International Search Report from Canadian Patent Office; International Application No. PCT/CA2008/002217; dated Apr. 8, 2009.

(Continued)

*Primary Examiner* — Kieu Oanh T Bui
(74) *Attorney, Agent, or Firm* — Faegre Baker Daniels LLP

(57) ABSTRACT

At one of a video source device and a video sink device, an indication of video processing capabilities of the other of the video source device and said video sink device is received. Based upon the indication and an indication of video processing capabilities of the one device, one of a plurality of video processing algorithms is selected for execution by the one device. The selecting may be based upon a set of precedence rules. Categories of video processing may for example include scan-rate conversion, interlacing, de-interlacing, denoise, scaling, color correction, contrast correction and detail enhancement.

19 Claims, 8 Drawing Sheets

U.S. PATENT DOCUMENTS

| | | | |
|---|---|---|---|
| 2008/0072261 A1* | 3/2008 | Ralston et al. | 725/62 |
| 2008/0201748 A1* | 8/2008 | Hasek et al. | 725/98 |
| 2009/0046205 A1 | 2/2009 | Strasser et al. | |

FOREIGN PATENT DOCUMENTS

| | | |
|---|---|---|
| EP | 1995952 A1 | 11/2008 |
| WO | 2007026126 | 3/2007 |
| WO | 2007102413 A1 | 9/2007 |

OTHER PUBLICATIONS

HDMI Transport Specification; TXH Blackbird; Mar. 9, 2006; pp. 1-31.

Content Descriptor Definitions; TXH Blackbird; Mar. 9, 2005; pp. 1-46.

EP Extended Search Report; EP Application No. 08861200.7 dated May 24, 2012.

HDMI Consortium; "High-Definition Multimedia Interface. Spec 1.1"; Version 1.1; May 20, 2004.

EP Extended Search Report; EP Application No. 08862385.5; dated Jul. 17, 2012.

HDMI licensing LLC, High-Definition Multimedia Interface Specification version 1.3a, Nov. 10, 2006, HDMI Licensing LLC, Ver 1.3a, p. 118-126.

HDMI Transport Specification; THX Blackbird; Mar. 9, 2006; pp. 1-31.

Content Descriptor Definitions; THX Blackbird; Mar. 9, 2005; pp. 1-46.

International Search Report from Canadian Patent Office; for International Application No. PCT/CA2008/002214; dated Mar. 23, 2009.

Nghiem, A.T. et al.; A New Evaluation Approach for Video Processing Algorithms; IEEE Workshop on Motion and Video Computing (WMVC'07); Feb. 28, 2007.

Chinese First Office Action; CN Application No. 200880126956.9; dated May 31, 2012.

Le, Rong. United States Patent and Trademark Office Office Action dated Sep. 27, 2011, in relation to U.S. Appl. No. 11/957,938, 24 pages.

Le, Rong. United States Patent and Trademark Office Office Action dated Mar. 28, 2012, in relation to U.S. Appl. No. 11/957,938, 19 pages.

Le, Rong. United States Patent and Trademark Office Office Action dated Sep. 24, 2012, in relation to U.S. Appl. No. 11/957,938, 21 pages.

Chinese Office Action; Chinese Application No. 200880126817.6; dated Sep. 18, 2012.

EPC Communication pursuant to Article 94(3); EP Application No. 08861200.7; dated Dec. 20, 2012.

\* cited by examiner

| Category 60 | Type of video processing 62 | available? 64 |
|---|---|---|
| scan-rate conversion | dropping/duplicating every N frames/fields | NO |
| | 3:2 pulldown | NO |
| | 2:2 pulldown | NO |
| | temporal interpolation without motion compensation | NO |
| | temporal interpolation with motion compensation | NO |
| interlacing | scan line decimation | NO |
| | vertical de-flicker filtering | NO |
| de-interlacing | scan line duplication | YES |
| | field merging | NO |
| | scan line interpolation | NO |
| | motion adaptive de-interlacing | NO |
| | motion compensated de-interlacing | NO |
| | diagonal edge interpolation | NO |
| de-noise | temporal | NO |
| | spatial (e.g. mosquito or de-blocking) | NO |
| scaling | pixel dropping and duplication | YES |
| | linear interpolation | YES |
| | anti-aliased resampling | NO |
| | content-adaptive scaling | NO |
| color correction | fleshtone correction | YES |
| | white-point correction | NO |
| | color-saturation enhancement | NO |
| contrast correction | non-content adaptive | YES |
| | content adaptive | NO |
| detail enhancement | sharpness enhancement | YES |
| | edge enhancement | NO |
| | super-resolution | NO |

FIG. 6

| Category 60 | Type of video processing 62 | available? 64 |
|---|---|---|
| scan-rate conversion | dropping/duplicating every N frames/fields | YES |
| | 3:2 pulldown | YES |
| | 2:2 pulldown | YES |
| | temporal interpolation without motion compensation | YES |
| | temporal interpolation with motion compensation | YES |
| interlacing | scan line decimation | YES |
| | vertical de-flicker filtering | YES |
| de-interlacing | scan line duplication | NO |
| | field merging | YES |
| | scan line interpolation | YES |
| | motion adaptive de-interlacing | YES |
| | motion compensated de-interlacing | YES |
| | diagonal edge interpolation | YES |
| de-noise | temporal | YES |
| | spatial (e.g. mosquito or de-blocking) | YES |
| scaling | pixel dropping and duplication | NO |
| | linear interpolation | NO |
| | anti-aliased resampling | YES |
| | content-adaptive scaling | YES |
| color correction | fleshtone correction | NO |
| | white-point correction | YES |
| | color-saturation enhancement | YES |
| contrast correction | non-content adaptive | NO |
| | content adaptive | YES |
| detail enhancement | sharpness enhancement | NO |
| | edge enhancement | YES |
| | super-resolution | YES |

FIG. 7

METHOD, APPARATUS AND MACHINE-READABLE MEDIUM FOR VIDEO PROCESSING CAPABILITY COMMUNICATION BETWEEN A VIDEO SOURCE DEVICE AND A VIDEO SINK DEVICE

FIELD OF TECHNOLOGY

The present disclosure relates video processing, and more particularly to a method, apparatus and machine-readable medium for video processing capability communication between a video source device and a video sink device.

BACKGROUND

It is not uncommon for video source devices (i.e. devices capable of outputting video data, such as Digital Versatile Disc (DVD) players, High-Density (HD) DVD players, Blu-ray disc players, set-top boxes, or PCs) and video sink devices (i.e. devices capable of receiving a video signal and further processing the data and/or displaying video images, such as televisions or monitors, which may be analog or digital devices such as Cathode Ray Tubes (CRTs), flat panel displays such as Liquid Crystal Displays (LCDs) or or plasma displays, or rear-projection displays such as Digital Light Processing (DLP) or Liquid Crystal on Silicon (LCoS) displays for example) to be purchased separately. For example, a consumer assembling a home entertainment system may purchase the video source device component from one manufacturer and the video sink device component from another manufacturer. The consumer's choice of components may be motivated by such factors as consumer preference, availability, or retailer promotions. The consumer may then interconnect the components within the home entertainment system so that the source device outputs video data to the sink device. The interconnection may be by way of one or more cables and may conform to a known industry standard, such as VGA, composite/S-video or component out, Digital Visual Interface (DVI), High-Definition Multimedia Interface™ (HDMI™) or DisplayPort®, for example.

Many contemporary video source devices are capable of applying numerous video processing algorithms to video data to improve the appearance or quality of the video images comprising the output video data. The video processing algorithms may fall into various categories, such as scan-rate conversion, interlacing, de-interlacing, de-noise (e.g. removal of analog broadcast noise), scaling, color correction, contrast correction and detail enhancement for example. Examples of video processing algorithms within the interlacing category include scan line decimation and vertical filtering. The video processing algorithms that are actually applied at the source device at any given time may be based on various factors, such as the nature of the video data (e.g. frame rate) or user preferences (e.g. an indication to use the maximum frame rate possible).

A video sink device may also be capable of applying numerous video processing algorithms to received video data, including some or all of the same video processing algorithms that the upstream video source device is capable of performing (referred to as "overlapping video processing capabilities"). The overlap may be by virtue of the fact that the video sink device is a modular component that is intended to be capable of interconnection with various types of video source devices whose video processing capabilities may vary. The video source device and video sink device may each have different strengths and weaknesses from a video processing standpoint. For example, the source device may be capable of numerous scan-rate conversion algorithms that the sink device is incapable of executing, while the sink device is capable of numerous de-interlacing algorithms that the source device is incapable of executing.

Disadvantageously, no convenient mechanism exists for identifying overlapping video processing capabilities as between a video source device and a video sink device.

A solution which obviates or mitigates the above-noted shortcoming would be desirable.

SUMMARY

In one aspect, there is provided a method comprising, at one of a video source device and a video sink device: receiving an indication of video processing capabilities of the other of said video source device and said video sink device; and based upon: (a) said indication; and (b) an indication of video processing capabilities of said one device, selecting one of a plurality of video processing algorithms for execution by said one device.

In another aspect, there is provided a machine-readable medium storing instructions that, when executed by a processor of one of a video source device and a video sink device, cause said one device to: receive an indication of video processing capabilities of the other of said video source device and said video sink device; and based upon: (a) said indication; and (b) an indication of video processing capabilities of said one device, select one of a plurality of video processing algorithms for execution by said one device.

In another aspect, there is provided a video source device comprising a processor and memory interconnected with said processor, said memory storing instructions which, when executed by said processor, cause said video source device to: receive an indication of video processing capabilities of a video sink device; and based upon: (a) said indication; and (b) an indication of video processing capabilities of said video source device, select one of a plurality of video processing algorithms for execution by said video source device.

In another aspect, there is provided a video sink device comprising a processor and memory interconnected with said processor, said memory storing instructions which, when executed by said processor, cause said video sink device to: receive an indication of video processing capabilities of a video source device; and based upon: (a) said indication; and (b) an indication of video processing capabilities of said video sink device, select one of a plurality of video processing algorithms for execution by said video sink device.

Other aspects and features of the present disclosure will become apparent to those ordinarily skilled in the art upon review of the following description of specific embodiments of the invention in conjunction with the accompanying figures.

BRIEF DESCRIPTION OF THE DRAWINGS

In the figures which illustrate an exemplary embodiment:

FIGS. 6 and 7 are schematic diagrams illustrating indications of video processing capabilities of the video source device and video sink device (respectively) of FIG. 2;

DETAILED DESCRIPTION

Figure 1:
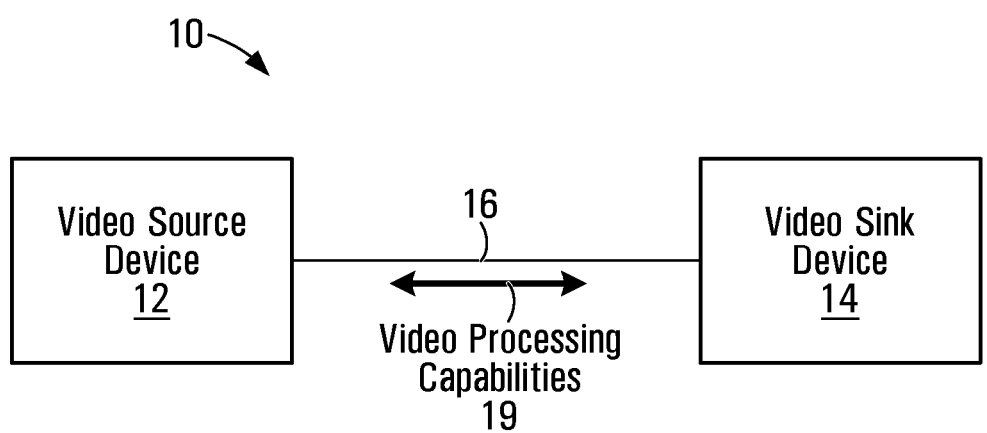
FIG. 1 is a schematic diagram of a system having a video source device and a video sink device.

Referring to FIG. 1, an exemplary system 10 is illustrated. The system 10 includes a video source device 12 and a video sink device 14 interconnected by a video data interconnection 16.

The video source device 12 is an electronic device that outputs video data, which may be in the form of frames or fields for example, over interconnection 16. The video source device 12 is capable of performing various types of video processing upon the video data prior to outputting the video data over interconnection 16. The video processing may be for purposes of improving the quality of the video images or converting between video formats for example, and may include scan-rate conversion, interlacing, de-interlacing, de-noise, scaling, color correction, contrast correction or detail enhancement for example. Depending upon the nature of the video source device 12, the video that is processed may be received by video source device 12 from an external source (e.g. cable head-end or satellite), read by device 12 from a storage medium (e.g. a hard drive or optical disk), or generated by device 12 (e.g. by a software application such as a video game) for example. Exemplary video source devices 12 include PCs, DVD players, HD DVD players, Blu-ray disc players, and set-top boxes (possibly having digital video recording capabilities) receiving video signals from any of a coaxial cable, satellite dish, telephone line, broadband over power line, ethernet cable, or VHF, UHF or HD antenna for example.

Video sink device 14 is an electronic device that receives video data over interconnection 16 and displays that data as video images. The device 14 is capable of performing video processing upon the received video data prior to displaying the images. The video processing of which the video sink device 14 is capable is wholly or partly the same as the video processing of which video source device 12 is capable (i.e. the video processing capabilities of devices 12 and 14 overlap). This overlap in video processing capabilities between devices 12 and 14 may be because the devices are modular components that are intended to be capable of interconnection not only with each other but also with various types of other video source device or video sink devices whose video processing capabilities may vary. Exemplary video source devices 14 include monitors and televisions, which may be Cathode Ray Tubes (CRTs), flat panel displays such as Liquid Crystal Displays (LCD) or plasma displays, or rear-projection displays such as Digital Light Processing (DLP) displays or Liquid Crystal on Silicon (LCoS) displays for example.

The video interconnection 16 is an interconnection for carrying video data from the video source device 12 to the video sink device 14 and for carrying other information in the same or opposite direction. The other information that is carried includes an indication of the video processing capabilities of the source device 12, an indication of the video processing capabilities of the sink device 14, or both. The transmission of this information is a focus of the present description. Physically, the interconnection 16 may be an electrical or optical cable, or it may simply be air between the devices 12 and 14 over which video data is wirelessly transmitted. The interconnection 16 may comply with a known video interconnect standard, such as the Digital Visual Interface (DVI), High-Definition Multimedia Interface™ (HDMI™), DisplayPort® (DP), Digital Flat Panel (DFP) Interface, Open LVDS Display Interface (OpenLDI), or Gigabit Video Interface (GVIF) standards for example. Alternatively, the interconnection 16 may be governed by a proprietary signalling protocol.

In overview, each of the video source device 12 and video sink device 14 stores an indication of its own video processing capabilities. The indication, which may be an electronic data file preset within the device at the factory for example (e.g. in ROM), identifies the video processing algorithms of which the device is capable in one or more video processing categories. Each device 12, 14 communicates its indication of its video processing capabilities to the other device, e.g. upon power up of the devices 12 and 14. This is schematically illustrated in FIG. 1 by way of bi-directional arrow 19.

Upon receipt of the indication of video processing capabilities of the other device, the recipient device may then select video processing algorithms that it will apply based on the received indication and the indication of video processing capabilities of the recipient device. Additionally, the selection may be based on a set of precedence rules for selecting video processing algorithms. The precedence rules, which may for example be a data structure, an electronic file, such as a data file or executable instructions (i.e., software), or user preferences, may specify logic for selecting a video processing algorithm based on the capabilities of each device, in terms of its capacity to perform the same or similar algorithms for example. Advantageously, overlapping video processing capabilities as between the video source device and the interconnected video sink device can be identified, and the determination of video processing algorithms to be executed at the recipient device may be made more intelligently based on the capabilities of the other device. This may permit such advantages as higher quality video images (e.g. through election of the best algorithms as between the two devices) or reduced power consumption at the recipient device (e.g. by avoiding processing that is unnecessary given the capabilities of the other device) to be achieved.

Figure 2:
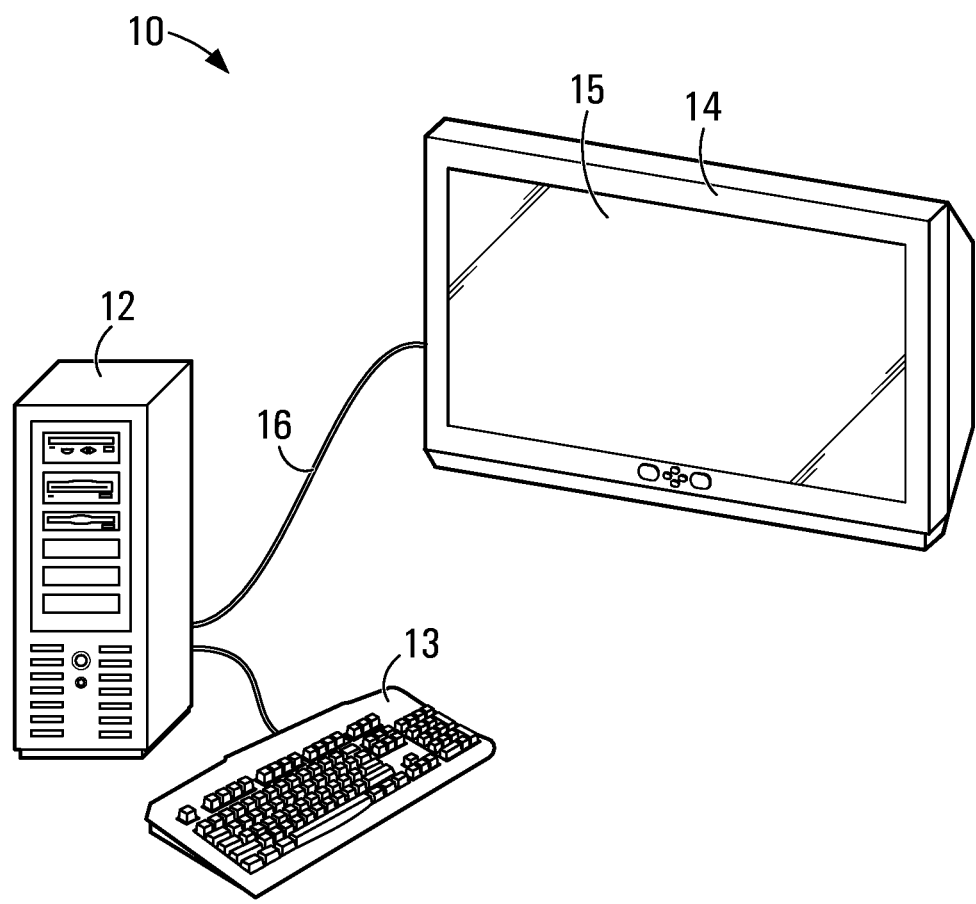
FIG. 2 is a schematic diagram illustrating in greater detail an exemplary system having a video source device and a video sink device.

FIG. 2 illustrates an exemplary system 10 in greater detail. In FIG. 2, the video source device 12 is a personal computer (or, more accurately, the CPU box 12 of a personal computer), the sink device 14 is an LCD television, and the interconnection 16 is a cable interconnecting the CPU box 12 with the television 14.

The CPU box 12, as its name suggests, is the portion of the personal computer which contains the main processor or CPU. The CPU box 12 includes various components other than the CPU, such as a power supply, memory, peripheral cards and cooling fan for example, none of which are illustrated. Notably, the CPU box 12 includes a graphics subsystem (GSS), which is modified from a conventional GSS to be capable of providing an indication of GSS video processing capabilities to television 14 and of receiving an indication of video processing capabilities of television 14 from that device, as described below.

A user input mechanism 13, such as a keyboard (as illustrated in FIG. 2), mouse, trackball, touch screen, tablet or combination of such devices, is also attached CPU box 12 and permits user to control the personal computer.

Sink device 14 is an LCD television which displays video data originating from the CPU box 12, and in particular, from the graphics subsystem of box 12, on its LCD screen 15. The television 14 is capable of applying various video processing algorithms to video data received from CPU box 12, as described below.

The cable 16 carries digital signals representing images to be displayed from the graphics subsystem of the CPU box 12 to the sink device 14. In the present embodiment, the cable conforms to the HDMI™ interface (e.g. HDMI™ version 1.3, release Jun. 22, 2006). In accordance with the HDMI™ specification, signals are transmitted in digital form. The HDMI™ spec supports the flow of information in the upstream direction from the sink device 14 to the source device 12. As will become apparent, this mechanism is used in a new way in the present embodiment, namely, to communicate the indication of video processing capabilities of sink device 14 to source device 12. This is an addition to the downstream communication of an indication of the video processing capabilities of video source 12 that occurs over the same cable, through other mechanisms, as will also be described. For clarity, the terms "upstream" and "downstream" as used herein are relative to the general direction of flow of video data between the devices, which is from device 12 to device 14.

HDMI™ interconnections such as cable 16 conform to the Display Data Channel (DDC) standard, which is known in the art. The DDC standard is promulgated by the Video Electronics Standards Association (VESA) and governs communication between a sink device and a graphics subsystem. The DDC standard provides a standardized approach whereby a video sink device can inform a video source device about its characteristics, such as maximum resolution and color depth, so as to permit the video source device to cause valid display configuration options to be presented to a user for example. Mechanically, the cable 16 incorporates three lines/pins for communicating sink device characteristics, namely, data, clock and ground, in accordance with the DDC standard. The specific version of the DDC standard to which the cable 16 of the present embodiment conforms is the Enhanced Display Data Channel (E-DDC™) Standard, Version 1.1 (Mar. 24, 2004). This standard is also promulgated by VESA (www.vesa.org).

Figure 3:
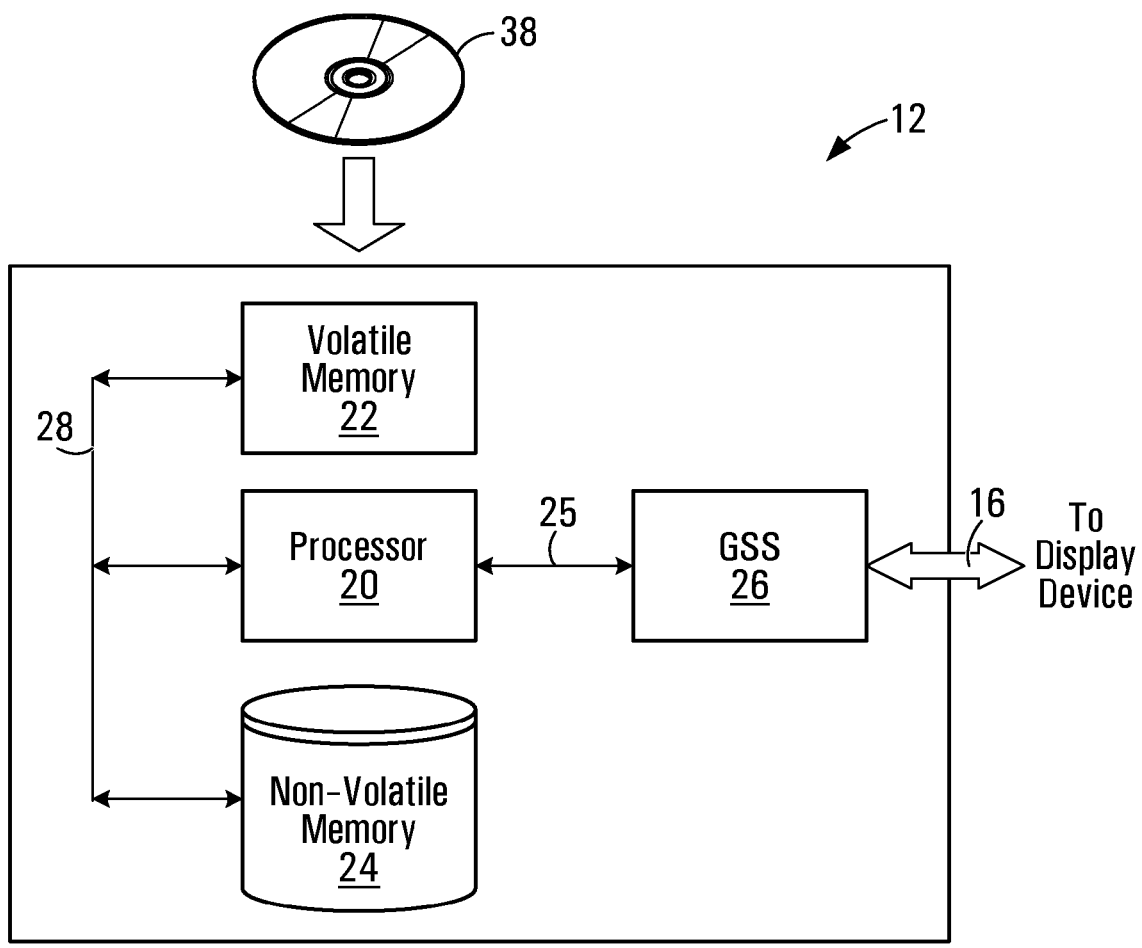
FIG. 3 is a schematic diagram illustrating a CPU box of the video source device of FIG. 2.

FIG. 3 illustrates the CPU box 12 of FIG. 2 in greater detail. As illustrated, the CPU box 12 includes a processor 20, volatile memory 22, non-volatile memory 24 and a graphics subsystem 26.

Processor 20 is the main processor of the CPU box 12 of FIG. 3. The processor 20 is conventional and may for example be a Pentium® microprocessor manufactured by Intel Corporation or an Athlon® micro-processor manufactured by Advanced Micro Devices, Inc. ("AMD"). Other types of processors manufactured by other corporations, such as Motorola, Inc., International Business Machines Corp., or Transmeta Inc., could alternatively be employed.

Volatile memory 22 is conventional random access memory which stores executable software and data during the operation of the system 10. Volatile memory 22 may be a form of Dynamic Random Access Memory (DRAM) for example. The executable software stored in memory 22 includes operating system software and application software. The operating system software may be a executable code representing conventional operating system such as Windows XP, Windows 2000, Windows NT®, Windows Vista® or Linux® for example. Other operating systems, such as UNIX®, Mac OS™, Solaris, SunOS, or HP-UX, could be employed in alternative embodiments. The application software may be a conventional application, such as a media player or video game, which causes 2D or 3D video images to be generated for display.

Non-volatile memory 24 is a conventional form of non-volatile memory, such as a hard disk drive for example, which may store executable software and data when the system 10 (FIG. 2) is powered down.

Processor 20, volatile memory 22 and non-volatile memory 24 are interconnected by way of a system bus 28. The specific implementation of bus 28 is not central to the present description.

The video data may be converted from a logical representation of 2D or 3D images by the GSS 26 before being output. In the present embodiment, the GSS 26 is a stand-alone expansion card, such as a Radeon® X800, Radeon® X800 Pro, or Radeon® X600 card manufactured by AMD. The GSS 26 could however be integrated into a motherboard of CPU box 12 in alternative embodiments. The interconnection 25 between the main processor 20 and GSS 26 in FIG. 2 may conform to a known bus specification such as the Accelerated Graphics Port (AGP) or PCI Express™ interface specifications. The GSS 26 serves as the point of connection for cable 16 of FIG. 1 at CPU box 12 (e.g. at the backplane of CPU box 12). The GSS of the present embodiment is capable of executing various video processing algorithms, as will be described.

Figure 4:
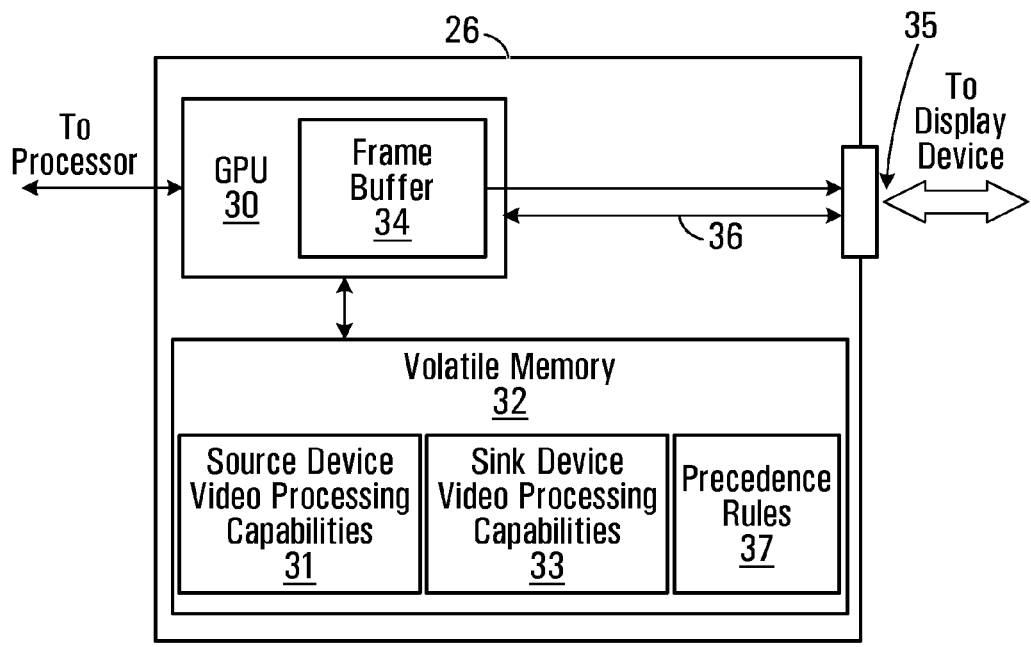
FIG. 4 is a schematic diagram illustrating a graphics subsystem of the CPU box of FIG. 3.

FIG. 4 illustrates the GSS 26 of FIG. 3 during system operation. As illustrated, the GSS 26 includes a graphics processing unit 30 and volatile memory 32. Other components have been omitted for clarity.

The graphics processing unit 30 is the processing engine which is responsible for generating the video data that is communicated over cable 16 to sink device 14 of FIG. 2, e.g. through conversion of a logical representation of a 2D or 3D image. The GPU 30 of the present embodiment is configured to be capable of performing the following categories of video processing: de-interlacing (scan line duplication only), scaling (pixel dropping and duplication or linear interpolation), color correction, contrast correction and detail enhancement. The GPU 30 of the present embodiment is not, however, configured to be capable of performing other categories of video processing, such as scan-rate conversion, interlacing and de-noise. It will be appreciated that, in other embodiments, the GPU 30 (or, more generally, video source device 12), may be configured to be capable of executing different categories of video processing. The GPU 30 includes a frame buffer 34. Frame buffer 34 is a buffer which stores processed video data which is ready for transmission to and display by the sink device 14. Its output is connected to the socket at backplane 35 to which cable 16 (FIG. 2) is connected by way of an HDMI™ transmitter (not illustrated). The HDMI™ transmitter is responsible for converting the video data for transmission over cable 16 in accordance with the operative HDMI™ standard. In alternative embodiments, the frame buffer 34 could form part of volatile memory 32 (described below).

Volatile memory 32 serves as temporary storage for image data during the application of video processing by GPU 30. Memory 32 is typically a form of RAM which supports high-speed memory access. Memory 32 is interconnected with GPU 30 in conventional manner. Memory 32 also stores an indication of video processing capabilities 31 of the video source device 12 (or, more specifically, of the GSS 26 component of video device 12) of which it forms a part, and an indication of video processing capabilities 33 of the sink device 14 (i.e. of television 14). The indication 31 originates from non-volatile memory of GSS 26 (e.g. ROM) while the indication 33 is received at run time in an upstream communication from the sink device 14.

In addition, memory 32 of the present embodiment stores precedence rules 37 for selecting one or more a video processing algorithms for execution by the GSS 26 of video source device 12 based on indications 31 and 33. The rules 37 assign a logical precedence to video processing algorithms within one or more categories based on the capabilities of the two devices 12 and 14. The rules 37 may have an underlying goal such as power conservation or maximum image quality for example. The rules 37 may take the form of an electronic data file or executable instructions (software) for example, and may be read from local ROM on system startup. Indications 31 and 33 and rules 37 could alternatively be stored in system volatile memory 22 (FIG. 3) in some embodiments.

Operation of the video source device 12 (and, more specifically, of GSS 26) as described herein may be governed by executable instructions loaded from a machine-readable medium 38, such as a optical disk, magnetic disk or read only memory chip for example, into volatile memory 22 (FIG. 3) or volatile memory 32 (FIG. 4). For example, this code may take the form of a driver, which is part of the operating system executing at CPU box 12.

Figure 5:
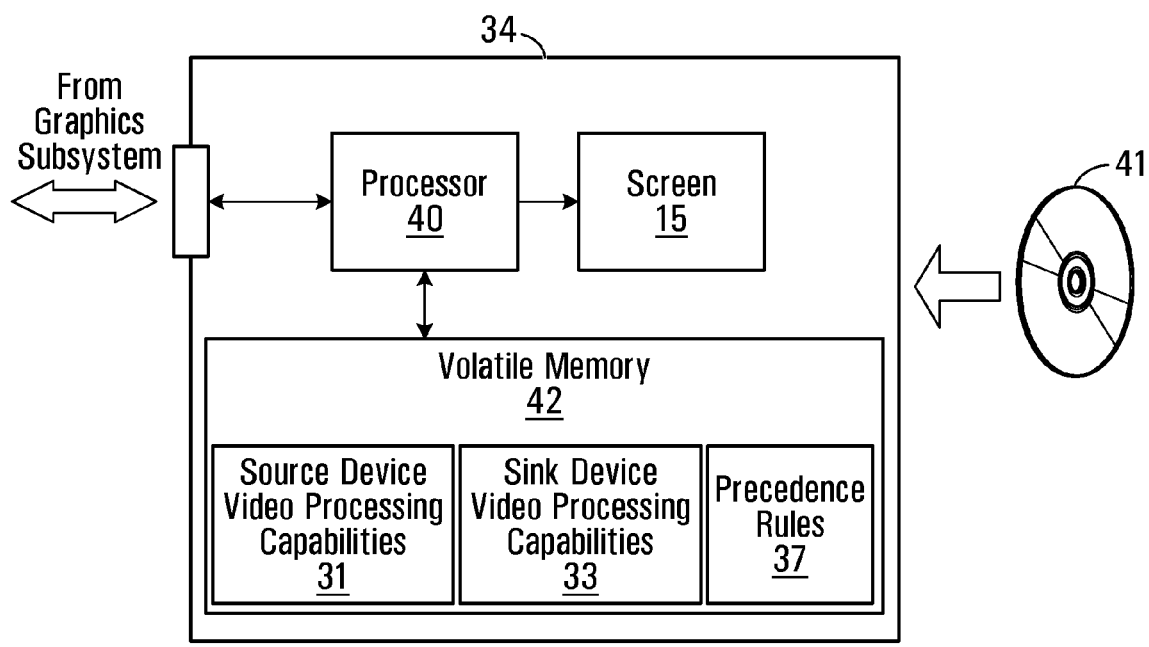
FIG. 5 is a schematic diagram illustrating the video sink device of FIG. 2 in greater detail.

FIG. 5 illustrates the video sink device 14 of FIG. 2 during system operation. As illustrated, video sink device 14 includes a processor 40, memory 42 and a screen 15 interconnected in a conventional manner. The operation of video sink device 14 as described herein may be governed by instructions loaded from a machine-readable medium 41, such as an optical disk, magnetic disk or read only memory chip for example, which may be executed by processor 40. Various other components of the sink device 14, such as an HDMI™ receiver for receiving video data over interconnection 16 and forwarding decoded video data to processor 40 and audio components (e.g. audio enhancement processor, speakers), are omitted from FIG. 5 for clarity.

Processor 40 is a video and graphics processor which receives video data and executes various video processing algorithms upon that data. The processor 40 is capable of performing video processing in each of the following categories: scan-rate conversion, interlacing, de-interlacing, de-noise, scaling, color correction, contrast correction and detail enhancement. The processor 20 receives video data from the GSS 26 via cable 16 (and via an HDMI™ receiver, not illustrated), which is connected to the sink device 14, e.g. at its backplane.

Volatile memory 42 stores an indication 31 of the video processing capabilities of the video source device 12 and an indication 33 of video processing capabilities of television 14. The indication 31 is received at run time in a downstream communication from the video source device 12 while the indication 33 is read from non-volatile memory (e.g. ROM) of television 14. In addition, memory 42 stores a set of precedence rules 37, which is the same set of rules 37 that is stored at GSS 26 of the video source device 12. The rules 37 may be read from local ROM at system startup. It should be appreciated that use of the same reference numeral 37 herein for the precedence rules in volatile memory 42 as for the rules stored in memory 32 of the video source device 12 should not be understood to mean that the format of the two sets of rules is necessarily identical in all embodiments employing such rules.

In the present embodiment, indication 33 forms part of a data structure which conforms to the known VESA Enhanced Extended Display Identification Data (E-EDID) Standard, Release A, 2.0 (September, 2006), which is hereby incorporated by reference hereinto. As is known in the art, that EDID standard defines a 128-byte data structure (which may be referred to as the "EDID 1.4" data structure) containing information which permits a modern computer to know what kind of monitor is connected to it. Accordingly, the EDID 1.4 data structure includes conventional display characteristic information such as vendor information, maximum image size, color characteristics, factory pre-set timings, frequency range limits, and character strings for the monitor name and serial number. The inclusion of the indication of video processing capabilities 33 within the EDID 1.4 data structure may require modification of conventional software and/or hardware which manipulates this data structure. As will become apparent, a rationale for incorporating indication 33 within the EDID 1.4 data structure is to take advantage of existing mechanisms for communicating information about sink device 14 (which does not conventionally include indication 33) to the source device 12. The indication of video processing capabilities 33 need not form part of an EDID data structure in all embodiments however. In some embodiments, the indication of video processing capabilities 33 may be defined within an EDID extension block. This may for example be the case if it is considered disadvantageous to alter the format of the primary EDID block from an accepted format.

The operation of the sink device 14 as described herein may be governed by machine-executable code which is stored in a read-only memory chip for example.

FIGS. 6 and 7 illustrate, in greater detail, the indications 31 and 33 of the video processing capabilities of devices 12 and 14 (respectively).

Referring to FIG. 6, the indication 31 is represented in the form of a table. It will be appreciated that the actual form of indication 31 within system 10 may be binary or textual (e.g. markup language) for example. Each of ten different categories of video processing of which the video source device 12 may be capable—namely, scan-rate conversion, interlacing, de-interlacing, de-noise, scaling, color correction, contrast correction and detail enhancement—is represented as a primary row within the table of FIG. 6, with the category being identified in column 60. Within each category, at least two video processing algorithms more specifically identified in column 62. Each video processing algorithm is represented as a secondary row within the primary row of the table. For example, the primary row representing the scan-rate conversion category includes one secondary row for each of the following five video processing algorithms in that category: dropping/duplicating every N frames/fields, 3:2 pulldown, other pulldown, temporal interpolation without motion compensation, and temporal compensation with motion compensation. The capacity of device 12 to execute each video processing algorithm is indicated in column 64. Based on the values of FIG. 6, for example, it should be apparent that device 12 is not capable of performing any of the scan-rate conversion or interlacing algorithms identified in the table, but is capable of executing one de-interlacing algorithm, namely scan line duplication.

FIG. 7 illustrates the indication 33 of video processing capabilities the sink device 14, using the same conventions as FIG. 6. Based on FIG. 7, it will be apparent that device 14 is capable of performing all of the various scan-rate conversion, interlacing and de-interlacing algorithms identified within the table, but is only capable of performing a subset of the video processing algorithms within the de-noise, scaling, color correction, contrast correction and detail enhancement video processing categories.

For clarity, the video processing algorithms identified in certain categories of video processing within the tables of FIGS. 6 and 7 are briefly described below.

Scan-Rate Conversion

Dropping/duplicating every N frames/fields—this is a simple form of scan-rate conversion in which one out of every N fields is dropped or duplicated. For example, the conversion of 60-Hz to 50-Hz interlaced operation may drop one out of every six fields. A possible disadvantage of this technique is apparent jerky motion referred to as "judder".

3:2 Pulldown—this technique is commonly used when converting 24 frames/second content to NTSC (59.94-Hz field rate). The film speed is slowed down by 0.1% to 23.976 (24/1.001) frames/second. Two film frames generate five video fields.

Other Pulldown—other types of pulldown, e.g. 2:2, 24:1, and others, may be performed.

Temporal Interpolation—this technique generates new frames from the original frames as needed to generate the desired frame rate. Information from both past and future input frames may be used to optimally handle appearing and disappearing objects. When converting from 50-Hz to 60-Hz using temporal interpolation, there are six fields of 60-Hz video for every five fields of 50-Hz video. After both sources are aligned, two adjacent 50-Hz fields are mixed together to generate a new 60-Hz field.

Motion Compensation—motion compensation attempts to identify true motion vectors within the video data and to use this information to during temporal interpolation to minimize motion artifacts. This can result in smooth and natural motion free from judder.

Interlacing

Scan Line Decimation—in this approach, every other active scan line in each noninterlaced frame is discarded.

Vertical De-Flicker Filtering—in this approach, two or more lines of noninterlaced data are used to generate one line of interlaced data. Fast vertical transitions are smoothed out over several interlaced lines.

De-Interlacing

Scan Line Duplication—scan line duplication duplicates the previous active scan line. Although the number of active scan lines is doubled, there is no increase in the vertical resolution.

Field Merging—this technique merges two consecutive fields together to produce a frame of video. At each field time, the active scan lines of that field are merged with the active scan lines of the previous field. The result is that for each input field time, a pair of fields combine to generate a frame. Moving objects may have artifacts, also called "combing," due to the time difference between two fields.

Scan Line Interpolation—scan line interpolation generates interpolated scan lines between the original active scan lines. The number of active scan lines is doubled, but the vertical resolution is not. In a simple implementation, linear interpolation is used to generate a new scan line between two input scan lines. Better results, may be achieved by using a Finite Impulse Response (FIR) filter:

Motion Adaptive De-interlacing—in "per pixel" version of this approach, field merging is used for still areas of the picture and scan line interpolation is used for areas of movement. To accomplish this, motion, on a sample-by-sample basis, is detected over the entire picture in real time. Several fields of video at thus processed at once. As two fields are combined, full vertical resolution is maintained in still areas of the picture. A choice is made as to when to use a sample from the previous field (which may be in the "wrong" location due to motion) or to interpolate a new sample from adjacent scan lines in the current field. Crossfading or "soft switching" is used to reduce the visibility of sudden switching between methods. Some solutions may perform "per field" motion adaptive de-interlacing to avoid the need to make decisions for every sample, as is done in "per pixel" motion adaptive de-interlacing.

Motion Compensated De-interlacing—motion compensated (or "motion vector steered") de-interlacing, which is several orders of magnitude more complex than motion adaptive de-interlacing, requires calculating motion vectors between fields for each sample and interpolating along each sample's motion trajectory. Motion vectors are also found that pass through each of any missing samples.

Diagonal Edge Interpolation—searches for diagonal lines and attempts to interpolate along those lines in order to remove apparent "staircase" effects.

Scaling

Pixel Dropping and Duplication—in this approach, which may be referred to as "nearest neighbor" scaling, only the input sample closest to the output sample is used. In pixel dropping, X out of every Y samples are thrown away both horizontally and vertically. A modified version of the Bresenham line-drawing algorithm is typically used to determine which samples not to discard. In pixel duplication, which can accomplish simple upscaling, X out of every Y samples are duplicated both horizontally and vertically.

Linear Interpolation—in this approach, when an output sample falls between two input samples (horizontally or vertically), the output sample is computed by linearly interpolating between the two input samples.

Anti-Aliased Resampling—this approach may be used to ensure that frequency content scales proportionally with the image size, both horizontally and vertically. In essence, the input data is upsampled and low-pass filtered to remove image frequencies created by the interpolation process. A filter removes frequencies that will alias in the resampling process.

Content-Adaptive Scaling—scaling is based in part on the data being scaled (in contrast to a universally-applied scaling algorithm)

Color Correction

Fleshtone correction, white-point correction, and color-saturation enhancement are all examples of different types of color correction algorithms that might be applied, in the alternative or in combination.

Detail Enhancement

Sharpness Enhancement—sharpness is increased through, e.g., examination of the brightness of adjacent pixels and enhancing contrast between them.

Edge Enhancement—detecting angles or edges within an image and amplifying them as a whole.

Super-Resolution—in order to improve the resolution of an image feature, information about the feature is collected over a sequence of frames in which the feature appears. That information may then be used to increase the sharpness of the feature in each of the frames.

It should be appreciated that the foregoing video processing algorithms are merely illustrative, and may differ in alternative embodiments.

Figure 8:
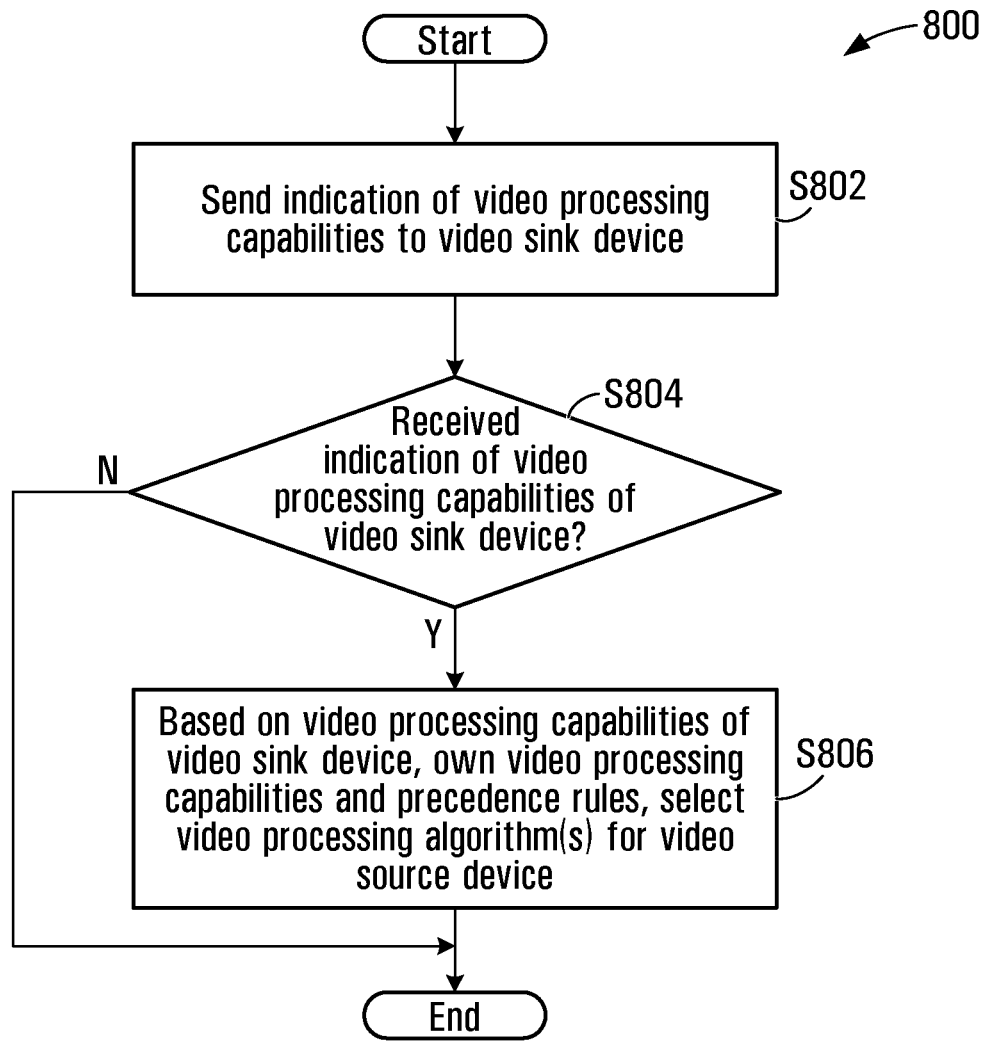
FIG. 8 is a flowchart illustrating operation of the video source device of FIG. 2.
Figure 9:
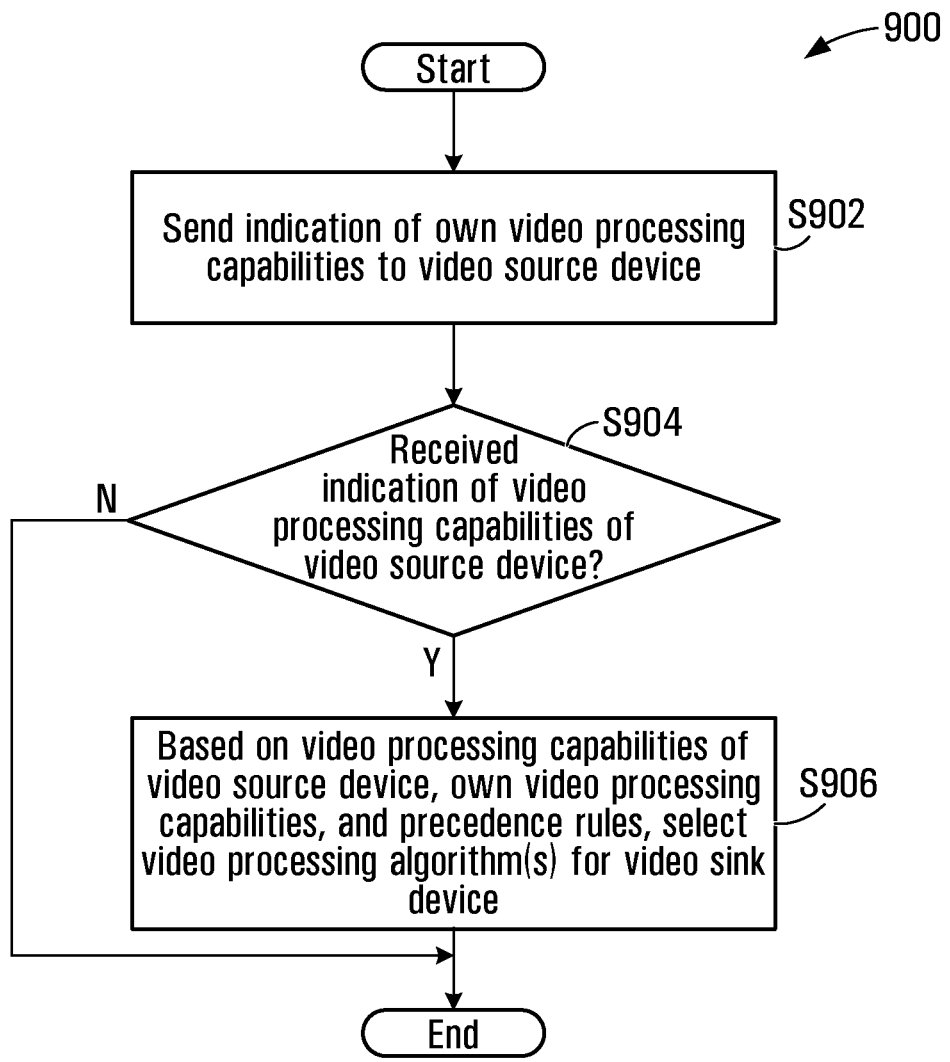
FIG. 9 is a flowchart illustrating operation of the video sink device of FIG. 2.

FIGS. 8 and 9 illustrate operation 800 and 900 of the present embodiment for communicating indication of video processing capabilities between devices 12 and 14 within the system 10. Operation 800 occurs at video source device 12 (specifically, at GSS 26) while operation 900 occurs at the video sink device 14.

It should be appreciated that, prior to commencement of operation 800 and 900, memory 32 of GSS 26 (FIG. 4) does not contain the indication 33 of video processing capabilities of the video sink device 14. It does however contain indication 31 (of the video processing capabilities of video source device 12) and precedence rules 37, which may be read from local ROM upon device activation. Moreover, the memory 42 of sink device 14 (FIG. 5) does not initially contain the indication 31 of video processing capabilities of the video source device 12, but does contain indication 33 (of the video processing capabilities of sink device 14) and precedence rules 37. The latter may similarly be read from local ROM upon device activation.

Referring to FIG. 8, the GSS 26 initially sends the indication 31 of its video processing capabilities (representing the capabilities of the video source device 12) downstream over interconnection 16 to the video sink device 14 (S802). This may be done during initialization of the video source device 12, e.g. upon detection of the sink device 14. The rationale for transmitting the indication 31 during the initialization stage, and possibly only during that stage, is that the indication 31 is not likely to change during the period of interconnection of the devices 12 and 14. However, it is recognized that the capabilities of devices 12 and 14 could change as it is not uncommon for such devices to have software/firmware updates applied/installed which provide for new and improved functionality. In general, 31 could be communicated over an auxiliary channel defined by a video interconnect standard governing interconnection 16 (if any), which is auxiliary to a primary channel over which video data is communicated (e.g. the Display Data Channel). Alternatively, the indication 31 could be sent in-band with video data being communicated over the interconnection 16, e.g. multiplexed within unused portions of the video data such as vertical or horizontal blanking intervals. The specific approach for achieving such in-band embedding of indication of video processing capabilities 31 may depend upon the operative video interconnect standard governing the interconnection 16 (if any). For example, embodiments whose interconnection conforms to the HDMI standard or the Consumer Electronics Association CEA 861 standard (Rev. D), the indication 31 could embed the information in one or more secondary data packets, referred to as "Info Frames" or "Info Packets", in the main channel of communication.

Referring to FIG. 9, the television 14 sends its own indication 33 of its video processing capabilities in the opposite direction (i.e. upstream) over interconnection 16 to the video source device 12 (S902). In the present embodiment, the indication 33 forms part of the EDID data structure that is communicated to the device 12 over an auxiliary channel, according to the known DDC2B standard, in order to provide display characteristics of television 14. The device 12 may request the data structure upon its detection of the sink device 14. It is noted that sending indication 33 only once may be sufficient, given that the indication 33 is not likely to change during the period of interconnection of the devices 12 and 14 (although, again, the capabilities of devices 12 and 14 might change in some embodiments upon application/installation of software/firmware updates providing new and improved functionality). In devices effecting Display ID data structures (successor to EDID), the indication 33 could form part of that data structure. In some embodiments, the VESA-promulgated Monitor Command and Control Set capability could be extended so as to communicate indication 33.

Independently of the upstream transmission of indication 33, the television 14 receives the indication 31 of the video processing capabilities of the video source device 12 and stores it within memory 42 (S904).

Referring to FIG. 8, the GSS 26 of video source device 12 receives the EDID 1.4 data structure from television 14, extracts the indication 33 of video processing capabilities of device 14 stores it within memory 32 (S804). The remainder of the EDID 1.4 data structure may be used conventionally at video source device 12.

Thereafter, one or more video processing algorithms are selected for execution at GSS 26 based on the video processing capabilities of the GSS 26 (as indicated by indication 31), the video processing capabilities of the television 14 (as indicated by the received indication 33), and the precedence rules 37 (S806). In the present embodiment, this involves comparing indication 33 with indication 31 and applying the set of precedence rules 37 to the outcome of the comparison in order to determine what algorithms are to be activated or deactivated at GSS 26. As will be appreciated, the result of operation S806 is largely dependent upon the precedence rules 37 that are applied.

For example, if the precedence rules 37 have as their primary goal the generation of video images within system 10 of the highest possible quality, then operation S806 may involve identifying which of the two devices 12 and 14 is capable of executing video processing algorithms that best support this goal. For example, assuming that the various de-interlacing algorithms identified in the table FIGS. 6 and 7 (i.e. scan line duplication, field merging, scan line interpolation, motion adaptive de-interlacing, and motion compensated de-interlacing) are ordered by the relative quality of the de-interlaced video that results from their execution, then the operation S806 may cause the GSS 26 to deactivate its scan line duplication (the only form of de-interlacing of which it is capable) because the television 14 is capable of performing all four other de-interlacing algorithms which are of higher quality.

Alternatively, if the precedence rules 37 have as their primary goal the conservation of power within system 10, then operation S806 may involve identifying which of the two devices 12 and 14 is capable of processing the video with the least amount of power being consumed. In this scenario, a minimum threshold of video processing for video images of an acceptable quality may be need to be met. This minimum threshold of video processing could be hard-coded within GSS 26 or may be based on user preferences.

It is possible for a set of precedence rules 37 to promote multiple objectives, such as providing maximum video image quality with the lowest possible power consumption. The objectives supported by precedence rules 37 may even be based in part on the nature of the devices 12 and 14 to which they pertain. For example, if the video source device 12 is powered by a conventional power supply while the video sink device 14 is powered by battery, then power conservation may only be an objective for only the latter device.

It should be appreciated that the activation/deactivation of one video processing algorithm at GSS 26 may bear upon whether another video processing algorithm may or may not be activated there, whether in the same category or in a different category of video processing. For example, if a form of de-interlacing is activated that necessarily involves scaling, then it may be necessary to activate scaling. These dependencies may be captured by the rules 37.

It should also be appreciated that the precedence rules 37 may, in some cases, take into account factors other than indication 31 and 33 in activating/deactivating video processing at GSS 26, such as user preference settings or the nature of the video data being processed. For example, in an embodiment in which either or both of video source device 12 and video sink device 14 is capable of performing inverse telecine video processing (i.e. converting from 60 fields/second to 24 frame/second by "undoing" a 3:2 pulldown sequence), the activation of this type of video processing may be contingent upon the detection of the 3:2 pulldown sequence within the video data. Moreover, the activation/deactivation of video processing may be influenced by factors other than the indication of video processing capabilities 31 and 33 and rules 37.

For example, a user of video source device 12 may be able to override any activation/deactivation of video processing resulting from operation S806. Thus, while operation 800 can assist in automatically selecting video processing algorithms to be executed by the GSS 26, it is not necessarily wholly determinative of the video processing algorithms that shall ultimately be performed there.

Referring again to FIG. 9, video processing algorithms for execution at television 14 are similarly selected based on the video processing capabilities of the video source device 12 (as indicated by the received indication 31), the video processing capabilities of the television 14 (as indicated by indication 33), and the precedence rules 37 (S906). In the present embodiment, operation S906 entails the same type of comparison of indication 31 with indication 33 and application of precedence rules 37 to the outcome of the comparison as was done at the GSS 26, described above.

Advantageously, because the set of precedence rules 37 applied at television 14 is the same one that is applied at GSS 26, it may be possible for each device to predict what video processing algorithms the other device will apply (or is likely to apply), so that the video processing algorithms executed at each device can be made to complement the video processing algorithms executed at the other device, even if neither has the capacity to directly control the other. This may permit precedence rules 37 to be written so as to logically apportion video processing as between the devices or to realize certain efficiency gains. For example, the rules 37 applied by GSS 26 may stipulate that, if television 14 is expected to apply video processing that would undermine or eradicate the effects of specific types of video processing of which GSS 26 is capable, then these specific types of processing should be deactivated at GSS 26. For instance, it may be desirable for noise reduction to occur before detail enhancement is performed, so that noise is not effectively enhanced during detail enhancement. The rules 37 may thus seek to ensure that noise reduction is performed first, or perhaps at the same device (source or sink) as, the detail enhancement. In another example, if the video sink device is capable of deinterlacing interlaced video, it may be desired for the video source device to refrain from performing vertical deflicker filtering. This is to prevent the "blurring" effect that may occur in the event that the sink device actually does perform de-interlacing upon video images to which vertical deflicker filtering has been applied.

Like operation 800, operation 900 can assist in automatically selecting the video processing algorithms to be executed by the television 14, but it is not necessarily wholly determinative of the video processing algorithms that shall ultimately be performed there, due to the possible influence of other factors such as user preferences or the nature of the video data, as discussed above.

It will be appreciated that S802 may occur after S804, S806 (FIG. 8). Similarly, S902 may occur after S904, S906 (FIG. 9).

As will be appreciated by those skilled in the art, modifications to the above-described embodiment can be made without departing from the essence of the invention. For example, the video source device 12 need not be a CPU box of a PC, but instead may be a DVD player, HD DVD player, Blu-ray disc player, an intermediate video processor (e.g. DVDO® iScan™ VP50), or set-top box (possibly having digital video recording capabilities) for example, or other source of video data. Moreover, the video sink device 14 may be something other than an LCD television, such as another type of television, a monitor or an intermediate video processor for example.

The video processing categories and video processing algorithms identified in indications 31 and 33 of FIGS. 6 and 7 may differ in other embodiments.

In another alternative, indications 31 and 33 of video processing capabilities could include a quality indicator for each video processing algorithm. The quality indicator may indicate the relative quality of algorithm, e.g. on an absolute scale of, say, 0 to 100, where 0 indicates very poor quality (or an inability to perform the relevant algorithm) and 100 indicates very high quality. The scale may be a standardized scale, e.g. set by a standards body based on an assessment of the video processing capabilities of comparable, commercially available devices. The use of a standardized scale may promote ready comparison of video processing capabilities between devices. In such cases, the rules 37 that determine the processing to be applied by the recipient device may take into consideration the relative quality levels of algorithms available at the recipient device as compared with the other device. For example, if the information received by one device from the other device includes a quality indicator that indicates that the other device is capable of performing a particular video processing algorithm at a higher quality level than the recipient device, the recipient device may elect to deactivate its own video processing in the relevant category so that the other device can activate its own, superior quality algorithm.

In a further alternative, the indications 31, 33 of video processing capabilities may include an indicator of relative power consumption for each video processing algorithm. These indicators too may conform to a standardized scale, to facilitate consideration of the anticipated power consumption resulting from video processing at each device, which may influence the selection of video processing algorithms at each device.

In some embodiments, the set of precedence rules 37 that is applied may be changed dynamically, e.g. by user configuration at the relevant device, through a graphical user interface for example. Alternatively, or in conjunction, the precedence rules 37 may be communicated between the video source device 12 and the video sink device 14, e.g. along with the indication 31 or 33 of video processing capabilities, or by another mechanism, so that each device 12 and 14 is sure to be using the same set of rules.

In some embodiments, only one of the two devices 12 or 14 may be capable of communicating its indication video processing capabilities to the other. The other device may then use this information to adjust its own video processing, as described above in conjunction with FIG. 8 or 9. This may be beneficial despite the fact that the device communicating its indication of video processing capabilities may have no indication of the video processing capabilities of the other device. If the device communicating its indication of video processing capabilities is the downstream device, then the upstream device, upon adjusting its video processing responsive to the receipt of that indication, may commence communicating metadata along with the video data flowing downstream over the interconnection between the devices, which metadata is indicative of the video processing that has been applied to the video data. Such communication of metadata along with video data is described in a U.S. patent application Ser. No. 12/339,625 entitled METHOD, APPARATUS AND MACHINE-READABLE MEDIUM FOR DESCRIBING VIDEO PROCESSING, which is hereby incorporated by reference hereinto. The metadata may provide the downstream device with an indication of the video processing algorithms that have actually be executed upstream, responsive to which the downstream device may elect to adjust its own video processing, e.g. by selecting different video processing algorithms for execution.

In some embodiments, the indications 31, 33 of video processing capabilities may reflect user configuration of the relevant device 12, 14 (respectively). For example, if the user of device 12 has manually turned off all interlacing algorithms at device 12, then the indication 31 may reflect the fact that the device 12 presently has no interlacing capability. If the user later activates one or more interlacing algorithms, a revised indication 31 could be sent which reflects the fact that interlacing algorithms are now available.

In some embodiments, a separate indication 31, 33 may be provided for each type of video stream that the interconnection 16 may carry. For example, a separate indication 31, 33 may exist for each of video modes 480i, 480p, 720p, 1080i and 1080p.

Other modifications will be apparent to those skilled in the art and, therefore, the invention is defined in the claims.

What is claimed is:

1. A method comprising:
   at one of a video source device and a video sink device:
      receiving an indication of video processing capabilities of the other of said video source device and said video sink device; and
      based upon:
         (a) said indication;
         (b) an indication of video processing capabilities of said one device; and
         (c) a set of precedence rules for use by each of the video source device and the video sink device for selecting video processing algorithms for execution,
      predicting what video processing algorithms will be executed by said other device; and
      based on the predicting, selecting video processing algorithms for execution by said one device.

2. The method of claim 1 further comprising communicating (b) to said other device.

3. The method of claim 1 wherein (a) identifies video processing algorithms that said other device is capable of executing and (b) identifies video processing algorithms that said one device is capable of executing.

4. The method of claim 1 wherein said selecting selects a video processing algorithm that said one device is capable of executing but said other device is incapable of executing.

5. The method of claim 1 wherein (a) and (b) comprise data structures.

6. The method of claim 5 wherein the data structures comprising (a) and (b) have a common format.

7. The method of claim 1 wherein said receiving an indication comprises receiving the indication over an auxiliary channel of an interconnection between said video source device and said video sink device, said channel being auxiliary to a primary channel of said interconnection for communicating video data from said video source device to said video sink device.

8. The method of claim 1 wherein (a) includes quality indicators indicative of a quality of each of the video processing algorithms executable by said other device, wherein (b) includes quality indicators indicative of a quality of each of the video processing algorithms executable by said one device, and wherein said selecting comprises determining, by comparing the quality indicators from (a) to the quality indicators from (b), that the one device is capable of performing the selected video processing algorithms at a higher quality level than the other device.

9. The method of claim 1 wherein (a) includes power consumption indicators indicative of a degree of power consumption associated with each of the video processing algorithms executable by said other device, wherein (b) includes power consumption indicators indicative of a degree of power consumption associated with each of the video processing algorithms executable by said one device, and wherein said selecting comprises determining, by comparing the power consumption indicators from (a) to the power consumption indicators from (b), that power consumption resulting from execution of the selected video processing algorithms at the one device is expected to be less than power consumption resulting from execution of the selected video processing algorithms at the other device.

10. The method of claim 1 further comprising receiving said set of precedence rules from said other device.

11. The method of claim 1 wherein said one device is the video source device.

12. The method of claim 11 wherein said receiving the indication comprises receiving an Enhanced Extended Display Identification Data (E-EDID) data structure.

13. The method of claim 1 wherein said one device is the video sink device.

14. A machine-readable medium storing instructions that, when executed by a processor of one of a video source device and a video sink device, cause said one device to:
   receive an indication of video processing capabilities of the other of said video source device and said video sink device; and
   based upon:
      (a) said indication;
      (b) an indication of video processing capabilities of said one device; and
      (c) a set of precedence rules for use by each of the video source device and the video sink device for selecting video processing algorithms for execution,
   predict what video processing algorithms will be executed by said other device; and
   based on the predicting, select one of a plurality of video processing algorithms for execution by said one device.

15. The machine-readable medium of claim 14 wherein said one device is the video source device.

16. The machine-readable medium of claim 14 wherein said one device is the video sink device.

17. A video source device comprising a processor and memory interconnected with said processor, said memory storing instructions which, when executed by said processor, cause said video source device to:
   receive an indication of video processing capabilities of a video sink device; and
   based upon:
      (a) said indication;
      (b) an indication of video processing capabilities of said video source device; and
      (c) a set of precedence rules to be used by each of the video source device and the video sink device for selecting video processing algorithms,
   predict that the video sink device will apply a detail enhancement video processing algorithm; and
   based on the predicting, select a noise reduction video processing algorithm for execution by said video source device.

18. The video source device of claim 17 wherein the instructions further cause the video source device to:
   when the predicting predicts that a deinterlacing video processing algorithm will be applied by the video sink device, refraining from performing a vertical deflicker filtering video processing algorithm at the video source device.

19. A video sink device comprising a processor and memory interconnected with said processor, said memory storing instructions which, when executed by said processor, cause said video sink device to:
  receive an indication of video processing capabilities of a video source device; and
  based upon:
    (a) said indication;
    (b) an indication of video processing capabilities of said video sink device; and
    (c) a set of precedence rules to be used by each of the video source device and the video sink device for selecting video processing algorithms,
  predict what video processing algorithms will be applied by the video source device; and
  select one of a plurality of video processing algorithms for execution by said video sink device, the selected video processing algorithm being selected so as to complement the video processing algorithms that are predicted to be applied by the video source device.

* * * * *